Feb. 12, 1957  D. B. CRAWFORD ET AL  2,781,270
MANUFACTURE OF MAYONNAISE
Filed March 31, 1953
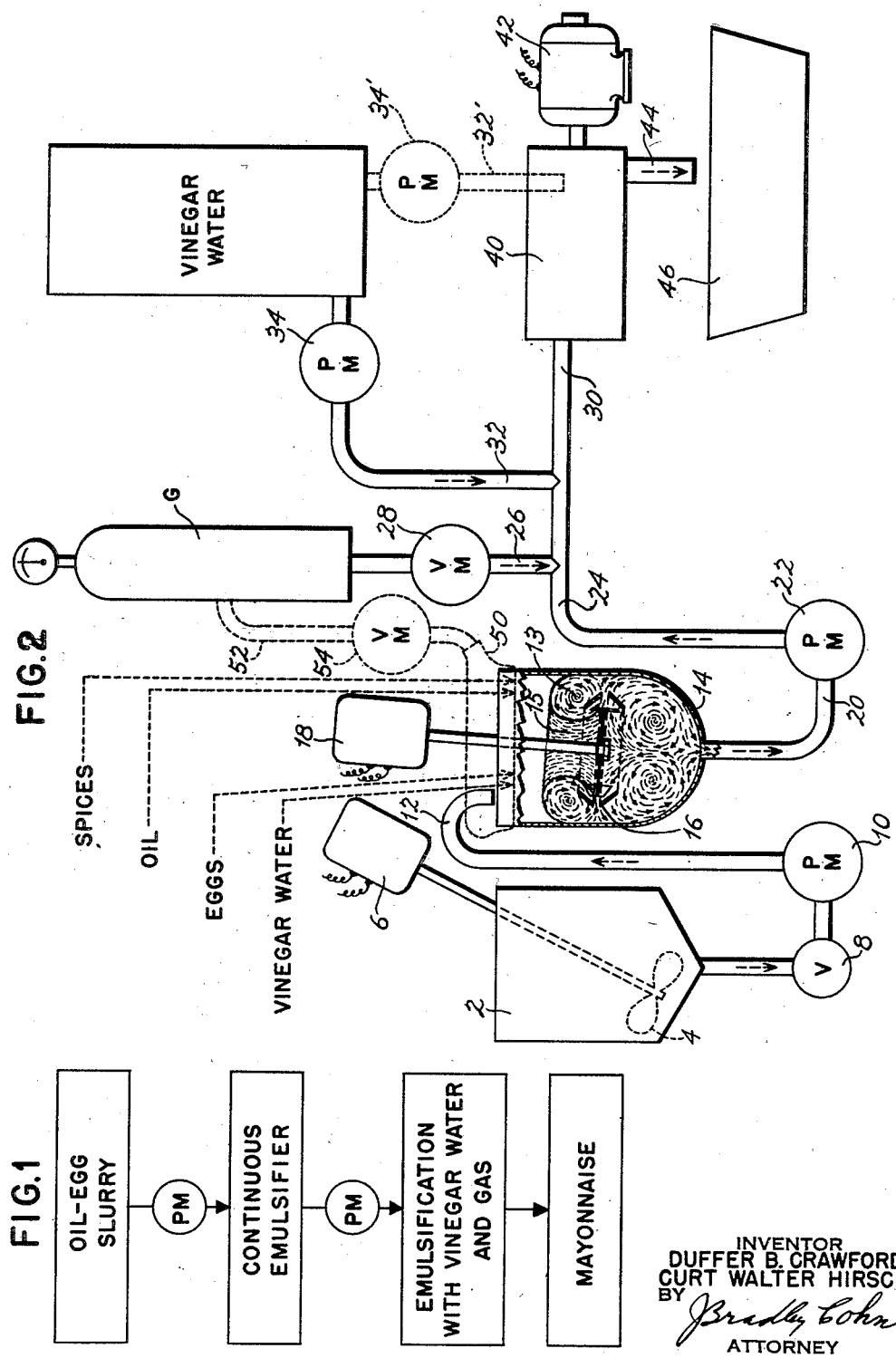
INVENTOR
DUFFER B. CRAWFORD
CURT WALTER HIRSCH
BY
Bradley Cohn
ATTORNEY

2,781,270

MANUFACTURE OF MAYONNAISE

Duffer B. Crawford, Westfield, and Curt Walter Hirsch, Glen Rock, N. J., assignors to American Machine & Foundry Company, a corporation of New Jersey Application March 31, 1953, Serial No. 345,974

11 Claims. (Cl. 99—144)

This invention relates in general to mixing or emulsifying and particularly to emulsions of oil in water though it may apply to emulsions of water in oil. More particularly, it relates to a method and apparatus for the continuous production of mayonnaise.

In mayonnaise, the lecithin of the eggs serves as an emulsifier. Other chemical emulsifiers are known for other oil-water emulsions.

For years, it has been the custom to produce mayonnaise by batch methods. Large mixing tanks or containers containing egg yolk and a small amount of vinegar would be used. The vinegar and eggs would be mixed slightly and then the oil was blended into the egg yolk slowly to form an emulsion. Generally, the oil was added to the egg yolk at a rate of approximately 1 lb. of oil to 1 lb. of egg per minute. Since the composition of mayonnaise is approximately ten times as much oil as there is egg yolk, it requires approximately ten minutes to make a batch of mayonnaise. This further means that the mixer must first "mix and blend" a batch of egg yolk which volume constitutes only 10% as much material as will exist in the mixer at the finish of the operation. In other words, the mixer must have an efficient operating range on a batch of 10% capacity to 100% capacity. This is a challenging problem for, if the agitation is too extreme, the emulsion may be reversed forming a very unstable water in oil emulsion which subsequently will break down. Thus, it may be seen that the industry has long been in need of an efficient mixer and method for producing mayonnaise. This invention is unique because it does two things which are new to the art of producing mayonnaise:

(1) It provides apparatus for converting oil and eggs into an emulsion at a rate heretofore unheard of. For example, it is possible to continuously convert oil and eggs into an emulsion at a rate of 50 lbs. of oil and 5 lbs. of eggs per minute in a mixer which contains 30 lbs. of material.

(2) The process outlined utilizes mixing the eggs and 20% of the vinegar in the oil to form an unstable suspension. This is maintained by agitation. One of the advantages gained by this is to eliminate the necessity of continuously metering each of the oil, the eggs and the vinegar.

Among those skilled in the art, it is a well known fact that the production of mayonnaise is doomed to failure if the eggs and vinegar are blended in the oil, thus forming a slurry or unstable suspension. It is understood that once an excess of oil is present, it is then impossible to develop a proper emulsion of oil in water.

Contrary to the above conception, we have found that it is possible to produce excellent mayonnaise by first forming a dispersion or slurry (unstable suspension) of the oil, eggs, spices and about 10% to 20% of the vinegar water and to pass this free-flowing mixture continuously through a mixer or emulsifier having high shear to develop an emulsified phase of the oil and then through a closed mixer where this emulsion is incorporated with a gas, such as air but preferably an inert gas, such as nitrogen or carbon dioxide. It is well known that mayonnaise containing an inert gas has better keeping qualities.

In one operational setup on a commercial basis, we continuously produced mayonnaise through a continuous mixer of this type, having a maximum holding capacity of 20 qts. at a rate of approximately 3,600 pounds per hour. This same result has been obtained in a larger scaled up mixer of 40 quart capacity at a production rate of 7,200 pounds per hour.

The mayonnaise produced was of superior grade, had an extraordinarily low plumet value and the emulsification was accomplished in a mixer in which the average hold-up time or average mixing time of the mayonnaise was just slightly more than 30 seconds.

It is accordingly an object of our invention to produce a superior type of mayonnaise on a continuous basis at a substantially higher rate per unit volume of equipment than has heretofore been accomplished.

Referring more particularly to the drawings:

Fig. 1 shows a flow sheet of my process steps; and

Fig. 2 is a schematic drawing of an apparatus practicing my process.

Referring more particularly to Fig. 2, the oil-egg slurry or dispersion is placed in bowl 2 where it is continually agitated by propeller 4 driven by motor 6. This oil-egg slurry consists of all the oil, egg and spices required in a formula for mayonnaise, plus 10–20% of the vinegar water called for in the formula, using, for example, the following general formula:

| | Pounds |
|---|---|
| Oil | 75 |
| Vinegar [1] | 12 |
| Spices [1] | 3 |
| Eggs (yolk) [1] | 10 |

[1] Water ingredients.

We then place 75 lbs. oil, 1.2 to 2.4 lbs. of vinegar, 3 lbs of spices and 10 lbs. of egg in the bowl 2. This slurry or dispersion, consisting of an oil phase in egg yolk, vinegar and spice, is maintained by the propeller 4 which has no operative function other than to sustain a uniform slurry or mixture by constant agitation. The slurry is free-flowing and is pumped by metering pump 10 through valve 8 and the pipe 12 to bowl 14. The purpose of this batch-like slurry is for convenience in measuring. We have also found it feasible to feed separately and continuously each of the several ingredients directly into the bowl 14 where they are converted to the mayonnaise-like pre-emulsion. This is indicated in dotted lines in Fig. 2 of the drawing. Any of the present commercial means for metered feed may be employed.

In bowl 14 we show a continuous mixer of the type employing a double cone impeller shown in the application of Duffer B. Crawford, S. N. 224,271, filed May 3, 1951. This impeller 16 is rotated rapidly by the motor 18. In a mixer of 20 qt. capacity, rotational velocities of 300 to 800 R. P. M., drawing 5 to 7 horsepower, are required. In a 40 qt. capacity bowl, rotational velocities of 700 to 1200, drawing 6½ to 7½ horsepower have proven satisfactory. The high shearing action produces an intermediate emulsified mayonnaise or mayonnaise-like product. The mayonnaise is thixotropic, hence is quite fluid while in the mixer, and is thus readily drawn through pipe 20 by metering pump 22 and fed through pipe 24, 30 to closed emulsifier 40.

The liquid level in bowl 14 must be properly maintained in accordance with the teaching of the above-mentioned Crawford application to form dynamic rotating donuts 13 with voretex 15. It is when the liquids are maintained in this conformation that the high shear required to produce the oil in water emulsion is secured.

Pipe 24 is in communication with a pipe 26 from which gas is metered by metering valve 28 from a source G of gas under pressure. As mentioned before, any gas may be used such as air. However, inert gases like $CO_2$ and $N_2$ are preferred. This mixture of gas and emulsion then passes into pipe section 30. The balance of the vinegar water is metered by metering pump 34 through pipe 32 communicating with pipe section 30 into the closed continuous mixer 40 driven by the motor 42. Mixer 40 is a closed continuous emulsifier operating under pressure and may be of the type shown, for example, in the Garnatz Patent No. 2,524,437 or the Shröder et al. Patent Re. 19,965. Operating pressures of 30 to 90 p. s. i. g. have been employed.

The final mayonnaise product is deposited through outlet 44 into a suitable receiving means indicated at 46. We have found that the emulsifier 40 operating under pressure develops a high grade low density mayonnaise. If the gas employed is inert, then as is well known in the art, the mayonnaise will be more resistant to oxidation.

In practicing our invention, we also found it desirable, and in several instances preferable, to control the feed and level in the bowl 14 by means of a float (not shown) rather than valve 8. For this we use a conventional float structure operating a valve, such as the valve 8, and set the control at a constant level in bowl 14.

We also found in initiating a run that it was most desirable to "seed" the bowl 14 with mayonnaise. When this was not done, considerable time was necessary to initiate in bowl 14 development of the mayonnaise-like oil in water emulsion, whereas if at the beginning of the run the bowl were "seeded" the conversion to mayonnaise began immediately.

We further found that with certain types of emulsifiers 40 it was more desirable to add the vinegar water near the discharge end of continuous emulsifier 40. This variation is shown in dotted lines in Fig. 2, showing the metering pump 34' and the pipe 32' identical to and substituted for elements 34 and 32, respectively.

If it is desired to exclude active gases, such as air, entirely from the mayonnaise mix, we have found that the bowl 14 may be conveniently hooded and inert gas, such as $CO_2$ or $N_2$ may be fed into the hood at a pressure just slightly in excess of atmospheric in order to exclude the air. Accordingly, in Fig. 2, there is shown in dotted lines the hood 50 fed by gas from the source G through pipe 52 metered down by metering valve 54.

Fig. 1 shows a flow sheet of the principal steps of the preferred embodiment of our invention. The oil-egg slurry is continuously metered into a continuous emulsifier. The resultant emulsion then passes continuously through a second metering pump into a further zone of emulsification where vinegar water and gas are incorporated to form high grade mayonnaise.

It must also be stated that the above is the preferred embodiment for practicing our invention to produce a superior grade of mayonnaise. However, we have found that mayonnaise is produced when all the vinegar water is added at the beginning. However, such mayonnaise does not have the desirable "peak" characteristic as mayonnaise produced by the embodiment set forth. Moreover, the total capacity of the apparatus is reduced.

Therefore, while it is our invention to produce a superior type of mayonnaise by a process wherein a large percentage of the vinegar water is added as a final step in the process, it is also our invention generally to produce mayonnaise by pre-emulsifying the liquid and solid ingredients of mayonnaise and then feeding this mayonnaise-like emulsion with gas to a final emulsifier.

We claim:

1. The method of producing mayonnaise continuously comprising, forming a thin free-flowing mixture of oil and egg in formula proportions and a relatively small amount of the vinegar water required by formula, continuously emulsifying said slurry and pumping under pressure said emulsified slurry and an inert gas and the remainder of the vinegar water required by formula into a closed chamber, vigorously agitating said constituents under pressure in said closed chamber, and continuously introducing the final mayonnaise from said closed chamber into a container at atmospheric pressure.

2. The method of producing mayonnaise comprising, forming a thin oil-egg mixture and a relatively small amount of the vinegar water required by formula, emulsifying said mixture and then adding gas and the remainder of the vinegar water required by formula under pressure into a closed chamber, vigorously agitating said constituents under pressure in said closed chamber, and releasing to atmospheric pressure.

3. The method of producing mayonnaise continuously comprising forming a free-flowing mixture of the oil and egg ingredients of mayonnaise and five to thirty percent of the vinegar water required in the final product, continuously emulsifying said mixture to form a mayonnaise-like emulsion, introducing under pressure said mayonnaise-like emulsion, a gas and the remainder of the vinegar water, and agitating the same vigorously to form mayonnaise.

4. The method of making mayonnaise which comprises, continuously and simultaneously feeding in formula proportions the egg and oil ingredients of mayonnaise through an area of intense agitation to continuously form an emulsion, continuously blending into said emulsion gas and vinegar water under pressure in formula proportions, conducting said blended materials under pressure into a closed high pressure area and there subjecting it to further intense agitation under pressure, and discharging into a zone at atmospheric pressure.

5. The method of continuously manufacturing mayonnaise comprising, continuously metering formula proportions of oil and egg and a quantity of vinegar water ranging from 5–35% of formula requirement of vinegar water into an area of intense agitation to form an emulsion, conducting continuously said emulsion from said area and forcing said emulsion into a high pressure area, metering under pressure gas and the balance of said formula requirement of vinegar water into said emulsion, and subjecting said mix of emulsion, gas and vinegar water to further intense agitation under pressure to form mayonnaise, and conducting said mayonnaise into an area of atmospheric pressure.

6. The method of continuously manufacturing mayonnaise comprising, continuously and simultaneously metering all the formula ingredients of mayonnaise into an area of intense agitation to form a mayonnaise-like emulsion, conducting said mayonnaise-like emulsion into an area of high pressure, introducing a gas under pressure into said area, mixing said gas under pressure with said mayonnaise-like emulsion and intensely agitating said mixture while in said area of high pressure to form mayonnaise of low specific gravity, and continuously conducting said mayonnaise from said area of high pressure to a zone of atmospheric pressure.

7. The method of continuously forming a stable low specific gravity oil in water emulsion comprising, continuously and simultaneously metering oil and water in formula proportions into an area of intense agitation to form an emulsion, continuously conducting said emulsion into an area of high pressure, continuously introducing a gas under pressure in said area, submitting said emulsion and gas under pressure in said high pressure area to further intense agitation to incorporate said gas with said oil in water emulsion, and continuously conducting said emulsion from an area of high pressure to a zone of atmospheric pressure.

8. The method of continuously manufacturing mayonnaise comprising, continuously and separately metering each of the formula ingredients of mayonnaise into an area of intense agitation to form a mayonnaise-like emulsion, conducting said mayonnaise-like emulsion into an area of high pressure, introducing a gas under pressure into said area, mixing said gas under pressure with said mayonnaise-like emulsion and intensely agitating said mixture while in said area of high pressure to form mayonnaise of low specific gravity, and continuously conducting said mayonnaise from said area of high pressure to a zone of atmospheric pressure.

9. The method of continuously manufacturing mayonnaise comprising, continuously and separately metering each of the oil and egg ingredients in formula proportion with a portion of the vinegar water required by formula into an area of intense agitation to form an emulsion, conducting continuously said emulsion from said area and forcing said emulsion into a high pressure area, metering under pressure gas and the balance of said formula requirement of vinegar water into said emulsion, and subjecting said mix of emulsion, gas and vinegar water to further intense agitation under pressure to form mayonnaise, and conducting said mayonnaise into an area of atmospheric pressure.

10. The method of continuously forming a stable low specific gravity oil in water emulsion comprising, continuously metering oil and water and an emulsifier into an area of intense agitation to form an emulsion, continuously conducting said emulsion into an area of high pressure, continuously introducing a gas under pressure in said area, submitting said emulsion and gas under pressure in said high pressure area to further intense agitation to incorporate said gas with said oil in water emulsion, and continuously conducting said emulsion from an area of high pressure to a zone of atmospheric pressure.

11. The method of continuously manufacturing mayonnaise comprising, placing a "seed" of mayonnaise in a continuous mechanical emulsifier, continuously and simultaneously adding to said seed of mayonnaise in said emulsifier all the formula ingredients of mayonnaise, continuously agitating said seed and said added ingredients in said emulsifier and continuously withdrawing therefrom the final emulsified mayonnaise.

References Cited in the file of this patent

UNITED STATES PATENTS

| | | |
|---|---|---|
| 1,949,791 | Epstein et al. | Mar. 6, 1934 |
| 2,000,646 | Rector | May 7, 1935 |
| 2,033,413 | Chapman | Mar. 10, 1936 |
| 2,294,172 | Getz | Aug. 25, 1942 |